(12) United States Patent
Anders et al.

(10) Patent No.: US 9,869,270 B1
(45) Date of Patent: Jan. 16, 2018

(54) PISTON DESIGN FOR JET PLACEMENT

(71) Applicant: Caterpillar Inc., Peoria, IL (US)

(72) Inventors: Jonathan W. Anders, Peoria, IL (US); Bobby John, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 15/338,651

(22) Filed: Oct. 31, 2016

(51) Int. Cl.
```
F02B 23/06      (2006.01)
F02F 3/24       (2006.01)
F02F 3/28       (2006.01)
F02F 1/24       (2006.01)
```

(52) U.S. Cl.
CPC ............ *F02F 3/24* (2013.01); *F02B 23/0624* (2013.01); *F02B 23/0678* (2013.01); *F02B 23/0687* (2013.01); *F02F 1/242* (2013.01); *F02F 3/28* (2013.01)

(58) Field of Classification Search
CPC .............. F02B 23/0678; F02B 23/0687; F02B 23/0624; F02B 23/063; F02F 3/24; F02F 3/28
USPC .................................. 123/295, 298; 92/173
See application file for complete search history.

(56) References Cited

U.S. PATENT DOCUMENTS

| | | | | |
|---|---|---|---|---|
| 2,151,218 A | * | 3/1939 | Lutz | F02B 23/0627 |
| | | | | 123/193.6 |
| 4,176,628 A | | 12/1979 | Kanai et al. | |
| 4,467,752 A | | 8/1984 | Yunick | |
| 4,616,612 A | * | 10/1986 | Jane | F02B 23/0651 |
| | | | | 123/276 |
| 5,065,715 A | * | 11/1991 | Evans | F02B 23/08 |
| | | | | 123/263 |
| 5,215,052 A | | 6/1993 | Augustin | |
| 5,285,755 A | * | 2/1994 | Regueiro | F01L 1/26 |
| | | | | 123/193.6 |
| 6,237,579 B1 | * | 5/2001 | Singh | F02B 19/12 |
| | | | | 123/193.5 |
| 6,708,666 B2 | * | 3/2004 | Roberts, Jr. | F02B 23/08 |
| | | | | 123/193.5 |
| 6,729,290 B1 | * | 5/2004 | Rorke | F01B 3/02 |
| | | | | 123/193.6 |
| 7,484,494 B2 | * | 2/2009 | Lippert | F02B 17/005 |
| | | | | 123/295 |

(Continued)

FOREIGN PATENT DOCUMENTS

| | | |
|---|---|---|
| DE | 2407783 A1 | 9/1974 |
| DE | 3742574 C1 | 3/1989 |

(Continued)

*Primary Examiner* — Erick Solis
(74) *Attorney, Agent, or Firm* — Leydig, Voit & Mayer, Ltd.

(57) ABSTRACT

An internal combustion engine includes a combustion chamber having a piston, the piston having at least one arcuate indent of a first type formed in the top surface, and at least one arcuate indent of a second type, wherein the first type includes a first recirculation surface having a concave shape at a first radius and extending along a spiral direction adjacent the entry surface, and wherein the second type includes a second recirculation surface having a concave shape at a second radius that is smaller than the first radius. During operation, a fuel jet provided into the first type occupies a radially outward portion of the combustion chamber, and a fuel jet provided into the second type occupies a central portion of the combustion chamber.

20 Claims, 5 Drawing Sheets

(56) References Cited

U.S. PATENT DOCUMENTS

| | | |
|---|---|---|
| 9,091,199 B2 | 7/2015 | Straub |
| 9,279,361 B2 | 3/2016 | Rothbauer et al. |
| 9,476,381 B2 * | 10/2016 | Bowing .............. F02B 23/0621 |
| 2010/0206263 A1 * | 8/2010 | Hasegawa ........... F02B 23/0651 |
| | | 123/279 |

FOREIGN PATENT DOCUMENTS

| | | |
|---|---|---|
| FR | 1373853 A | 10/1964 |
| JP | 61-232320 A | 10/1986 |
| JP | 11-93673 A | 4/1999 |

* cited by examiner ately directed fuel jets into the combustion chamber, the nozzle tip having at least one nozzle opening configured to inject a fuel jet into the combustion chamber and along a fuel jet centerline. At least one arcuate indent of a first type is formed in the top surface, the at least one arcuate indent of the first type being aligned with the fuel jet centerline and including a first entry surface extending from a central portion of the piston, a first recirculation surface having a concave shape at a first radius and extending along a spiral direction adjacent the entry surface, and a wall extending generally in an axial direction and disposed radially along the first recirculation surface. At least one arcuate indent of a second type is formed in the top surface and adjacent the at least one arcuate indent of the first type, the at least one arcuate indent of the second type being aligned with a second fuel jet centerline and including a second entry surface extending from a central portion of the piston, a second recirculation surface having a concave shape at a second radius that is smaller than the first radius, the second recirculation surface extending along a plane that is perpendicular to the top surface and intersecting a diameter of the top surface, and a wall extending generally in an axial direction and disposed radially along the second recirculation surface. During operation, a fuel jet provided into the at least one arcuate indent of the first type is arranged to occupy a first region disposed in a radially outward portion of the combustion chamber, and a fuel jet provided into the at least one arcuate indent of the second type is arranged to occupy a second region disposed in a central portion of the combustion chamber.

PISTON DESIGN FOR JET PLACEMENT

TECHNICAL FIELD

This patent disclosure relates generally to internal combustion engines and, more particularly, to combustion chamber features for direct injection engines.

BACKGROUND

Most modern engines are direct injection engines, which means that each combustion cylinder of the engine includes a dedicated fuel injector configured to inject fuel directly into a combustion chamber. While direct injection engines represent an improvement in engine technology over past designs, in the form of increased engine efficiency and reduced emissions, the improvement of the design of any particular engine is always desirable, especially in light of increasing fuel costs and ever more strict regulations on engine emissions.

In a traditional direct injection engine, one or more fuel jets that are injected into a combustion chamber interact with various combustion chamber structures, which cause the fuel to disperse into the combustion chamber. More specifically, the fuel jet(s) entering the combustion chamber impact various surfaces of the combustion chamber such as a piston bowl, the flame deck surface of the cylinder head, the cylinder liner or bore, and other surfaces before spreading in all directions. The impingement of the fuel jets with these structures may have a variety of effects including increased emissions because localized areas having higher fuel concentrations may burn rich while other areas on the cylinder may burn lean. This can further result in higher temperatures, decreased fuel efficiency, increased heat rejection and component temperatures, and the like.

Various solutions have been proposed in the past for improving an engine's efficiency and reducing its emissions. One example of a previously proposed solution can be seen in U.S. Pat. No. 9,091,199 ("Straub"), which was granted on Jul. 28, 2015. Straub describes a combustion chamber that includes a piston forming deflection foils. The deflection foils, according to Straub, operate to distribute a fuel spray into portions directed toward one of the deflection foils, which redirect their respective portion of the fuel spray into a combined radial path that swirls about a center of the combustion. In the described embodiment, Straub explains that the fuel spray is thus directed substantially tangential relative to the combined radial path of the redirected portions of the fuel spray. While the flow redirection of Straub may be partially effective in improving mixing of air with incoming fuel in the combustion chamber, the momentum of the redirected fuel spray is maintained generally parallel to a top piston surface such that the induced swirling may cause fuel to migrate towards a cylinder wall. Maintaining the fuel close to the piston may also increase heat rejection while the fuel is burning.

SUMMARY

In one aspect, the disclosure describes an internal combustion engine. The engine includes an engine block having at least one cylinder bore, and a cylinder head having a flame deck surface disposed at one end of the cylinder bore. A piston is connected to a rotatable crankshaft and configured to reciprocate within the cylinder bore, the piston having a crown portion facing the flame deck surface such that a combustion chamber is defined within the cylinder bore and between a top surface of the crown portion and the flame deck surface. A fuel injector has a nozzle tip disposed in fluid communication with the combustion chamber, the nozzle tip having at least one nozzle opening configured to inject a fuel

DETAILED DESCRIPTION

This disclosure relates to internal combustion engines and, more particularly, to features incorporated within at least one combustion chamber of the engine to contain and redirect fuel jets or streams of liquid and/or gaseous fuel provided by separate fuel injector nozzle openings. The fuel jets are redirected and also segregated during a majority of the injection time to promote better fuel/air mixing and a more uniform fuel/air mixture within the combustion chamber as compared to previously proposed or known combustion systems. The various exemplary embodiments described herein include structures and features that operate or result in redirecting fuel jets circumferentially with respect to the cylinder bore of an engine, to thus avoid, minimize or, at least, delay interaction between adjacent fuel jets entering the combustion chamber. The design features redirect each fuel jet separately to create a spiral motion within the combustion chamber independently from any swirl generated from the use of valve inserts or port design changes. In the described embodiments, this is accomplished, at least in part, by directing an impact or impingement of one or more jets of combusting fuel towards an interior of the combustion chamber and away from the cylinder head, the valves, and the cylinder liner. The combustion and heat release are, in this fashion, kept away from surfaces and insulated within the combustion chamber by the surrounding fluids within the combustion chamber, which in turn leads to lower component temperatures, increased fuel efficiency, and a more uniform fuel/air mixture, which also leads to lower engine emissions.

Figure 1:
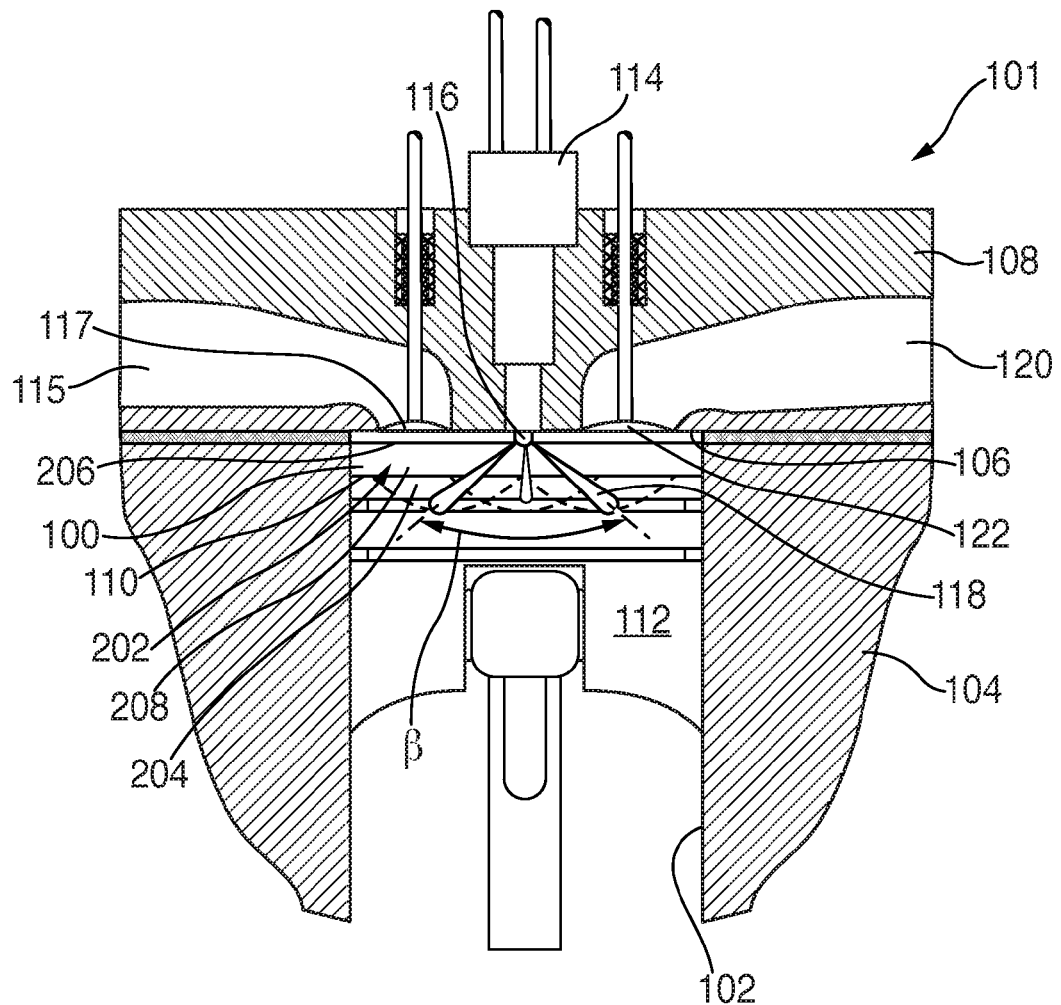
FIG. 1 is a cross section of an engine combustion chamber in accordance with the disclosure.

A cross section of a combustion chamber 100 of an engine 101 in accordance with the disclosure is shown in FIG. 1. The combustion chamber 100 has a generally cylindrical shape that is defined within a cylinder bore 102 formed within a crankcase or engine block 104 of the engine. The combustion chamber 100 is further defined at one end by a flame deck surface 106 of a cylinder head 108, and at another end by a piston crown 110 of a piston 112 that is reciprocally disposed within the bore 102. A fuel injector 114 is mounted in the cylinder head 108. The injector 114 has a tip 116 that protrudes within the combustion chamber 100 through the flame deck surface 106 such that it can directly inject fuel into the combustion chamber 100.

During operation of the engine 101, air is admitted into the combustion chamber 100 via an air inlet passage 115 when one or more intake valves 117 (one shown) are open during an intake stroke. In a known configuration, high pressure fuel is permitted to flow through nozzle openings in the tip 116 to form fuel jets that enter the combustion chamber 100. Each nozzle opening creates a fuel jet 118 that generally disperses to create a predetermined fuel/air mixture, which in a compression ignition engine auto-ignites and combusts. The fuel jets 118 may be provided from the injector at an included angle, β, of between 110 and 150 degrees, but other angles may also be used. Following combustion, exhaust gas is expelled from the combustion chamber through an exhaust conduit 120 when one or more exhaust valves 122 (one shown) is/are open during an exhaust stroke.

The uniformity and extent of fuel/air mixing in the combustion cylinder is relevant to the combustion efficiency as well as to the amount and type of combustion byproducts that are formed. For example, fuel-rich mixtures, which may be locally present within the combustion chamber 100 during a combustion event due to insufficient mixing, may lead to higher soot emissions and lower combustion efficiency. In the illustrated embodiments, more-uniform fuel/air mixing is managed for each fuel jet by forming a plurality of arcuate indents symmetrically around and into the crown surface of the piston. Each arcuate indent serves to accept, contain, redirect and segregate therein one of a plurality of fuel streams originating from one of a plurality of nozzle openings in the fuel injector from mixing with other fuel streams from the remaining nozzle openings, at least for a period, during an injection and/or fuel burning event in the combustion chamber during operation. Each arcuate indent presents a cambered, pitched face on the top surface of the piston, which leads into a concave feature formed or otherwise constructed into the top piston face.

Figure 2:
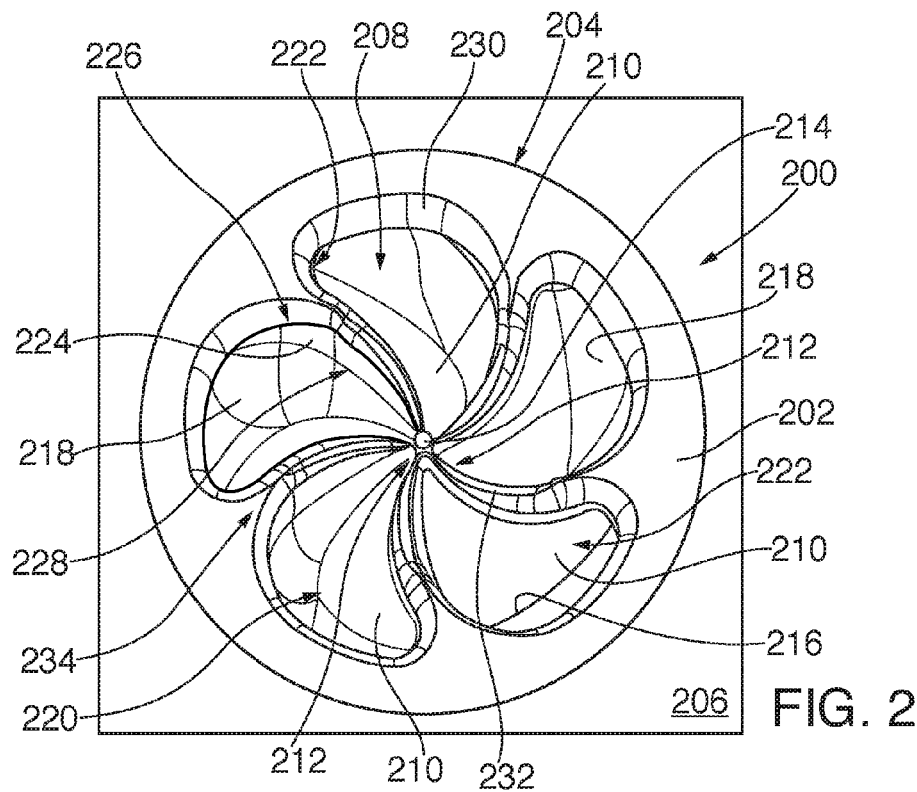
FIG. 2 is a top view of an engine piston in accordance with the disclosure.

An exemplary embodiment of the piston 112 is shown in FIG. 2. In the illustration of FIG. 2, only a top surface 200 of the piston crown 110 of the piston 112 is shown for simplicity. The top surface 200 has a generally circular shape that encloses a crown surface 202. The top surface 200 is defined within a circular periphery 204 and has a generally flat shape that extends along a single plane 206 that is nominally disposed in perpendicular relation to a centerline axis of the bore 102 (FIG. 1). Included within the top surface 200 is a plurality of arcuate indents 208, which have a concave shape extending away from the plane 206 in a direction into the body of the piston 112 (i.e., in a downward direction in the orientation shown in FIG. 1). In the illustrated embodiment, five arcuate indents 208 are shown, but fewer or more arcuate indents can be used on any one particular piston. In use, it is contemplated that there will be as many arcuate indents as nozzle openings in the injector tip such that each fuel jet provided by the injector will correspond to one arcuate indent of the piston. It should also be appreciated that not all arcuate indents might have the same shape. In this embodiment, the fuel injector 114 (FIG. 1) includes five nozzle openings formed in the tip 116 such that five fuel jets 118 are produced during engine operation. As shown, all five arcuate indents 208 have the same shape to redirect the five fuel jets 118 provided by the injector in the same of a similar, symmetrical fashion. When the piston 112 is reciprocally mounted in the bore 102 of the engine 101, the top surface 200 is oriented such that each of the fuel jets 118 is injected in a direction such that the fuel jet 118 enters into a respective arcuate indent 208 to be redirected thereby during engine operation.

Each arcuate indent 208 presents various flat, concave or convex surfaces, which directly or indirectly redirect the respective fuel jet provided into the arcuate indent 208 during operation. In the illustrated embodiment, each arcuate indent 208 includes a flat, entry surface 210. For each particular arcuate indent 208, the entry surface 210 lies along a plane that is disposed at an acute angle relative to the plane 206 of the piston crown. The entry surface 210 has a generally triangular shape with curved edges that includes a central point 212 disposed adjacent a piston surface center 214. The entry surface 210 extends away from the piston surface center 214 in a radial direction along the angled plane to provide a cambered or pitched surface that, during operation, engages and contacts the respective fuel jet to direct it along the plane and into the arcuate indent 208.

Opposite the central point 212, the entry surface 210 has a generally curved edge 216 that is sickle-shaped and may include a break or inflection, which forms a transition between the entry surface 210 and a recirculation surface 218. The recirculation surface 218, which forms a bottommost portion of the arcuate indent 208, has a concave shape that sweeps in a spiral direction radially outwardly from the piston center portion along the curved edge 216. A cross section available for fuel jet redirection of the recirculation surface 218 is maximum along a middle portion thereof, adjacent a second point 220 of the entry surface 210, and decreases in both radial directions inwardly and outwardly with respect to the piston center portion such that it becomes minimum adjacent each of a third point 222 and the central point 212 of the generally triangular entry surface 210.

Each arcuate indent 208 further includes a wall 224 extending generally parallel or at a slight angle relative to a piston crown centerline or symmetry axis. The wall 224 has a variable width or height that is minimum along the wall's radially inward and outward ends, and maximum along a middle portion thereof. The wall 224 presents a top edge 226 having a generally curved shape and a bottom edge 228 that follows an external edge of the recirculation surface 218. At an interface or rim of each arcuate indent 208 with respect to the flat crown surface 202 is disposed a convex transition 230. A plurality of depressed surfaces 232 that bow away from the plane 206 of the crown surface 202 may also be formed around the piston such that the piston surface center 214 protrudes as a peak relative to the surrounding arcuate indents 208.

Figure 3:
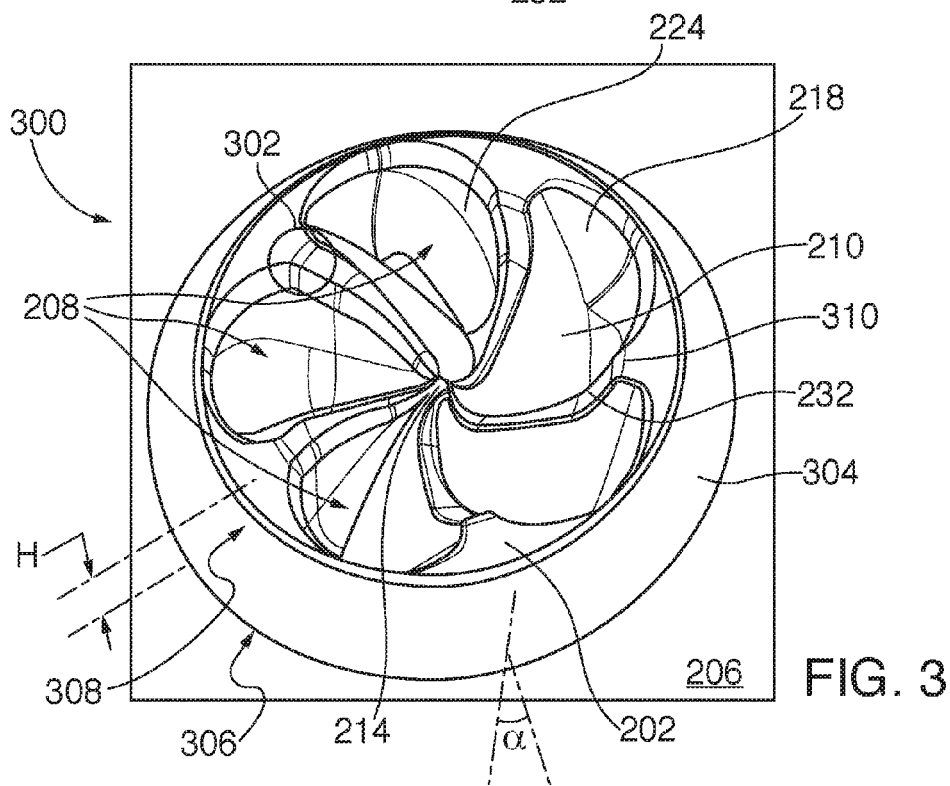
FIG. 3 is a perspective view of a top surface of a piston in accordance with an alternative embodiment.

An alternative embodiment for a top surface 300 of a piston in accordance with the disclosure is shown in FIG. 3. In this embodiment, the same or similar features and structures as the top surface 200 (FIG. 2) are denoted by the same reference numerals previously used for simplicity. The top surface 300, similar to the top surface 200, includes an arrangement of five arcuate indents 208, but in this embodiment, a transition between indents in a radially outward region 302 is truncated to create a segmented circular periphery 310 that surrounds the central depression around the piston surface center 214. For comparison, in the top surface 200, there is no pronounced periphery such that the flat crown surface 202 extends between the indents forming sharp angles 234.

The top surface 300 further includes a frusto-conical outer surface 304, which creates an empty space around a top, outer periphery of the piston. The outer surface 304 opens up the squish-region of the piston, that is, the region along the outer peripheral cylindrical surface of the piston that is disposed above the upper seal ring of the piston and occupies the cylindrical space between the piston and the inner surface of the piston bore. In the illustrated embodiment, the outer surface 304 extends at an acute angle, a, between a top edge 306 of the outer cylindrical portion of the piston crown and an outer periphery 308 of the flat crown surface 202, and occupies a height, H, in an axial direction along the centerline of the piston crown. It is contemplated that the angle, a, can be between 0 and 60 degrees, but other angles may also be used.

Figure 5:
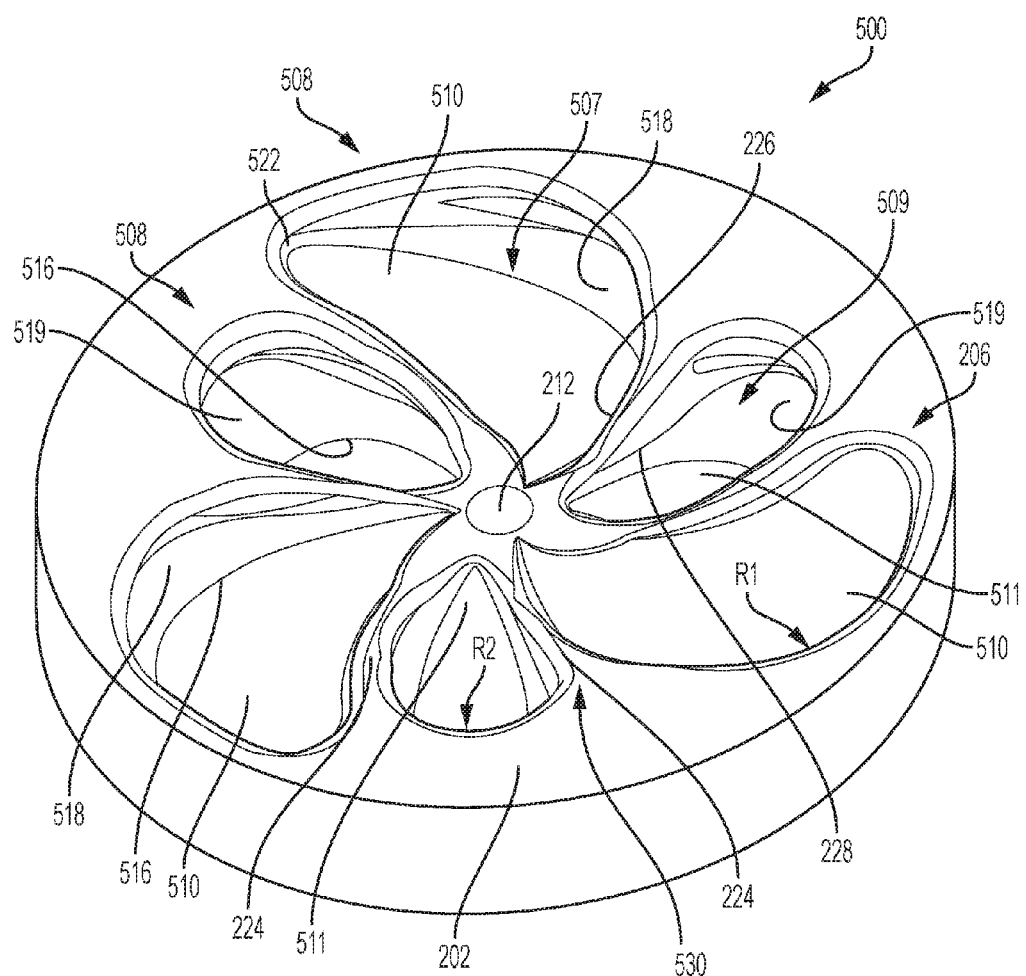
FIG. 5 is a perspective view of a top surface of a piston in accordance with an alternative embodiment.

An alternative embodiment for a top surface 500 of a piston in accordance with the disclosure is shown in FIG. 5. In this embodiment, the same or similar features and structures as the top surface 200 (FIG. 2) are denoted by the same reference numerals previously used for simplicity. The top surface 500, similar to the top surface 200, includes an arrangement of arcuate indents 508 but, in this embodiment, the arcuate indents 508 are arranged in two types, a first type 507 having a relatively shallower bending recirculation effect that is arranged to redirect fuel jets towards a radially outer region of the combustion chamber, and a second type 509 having a relatively tighter bending recirculation effect that is arranged to redirect fuel jets towards a central region of the combustion chamber. The arcuate indents 508 of the first type 507 and the second type 509 are arranged in alternating fashion at equal angles around the entire face of the top surface 500 and, as shown, are arranged in two sets of three arcuate indents of each type arranged in 60 degree intervals, but another arrangement of odd or even numbers of either type of arcuate indent may also be used. Each arcuate indent 508 receives a fuel jet for redirection such that some fuel jets are directed to the outer regions of the cylinder while other fuel jets are directed towards the central region of the cylinder to disperse the fuel within the cylinder for a more uniform burn.

In reference to FIG. 5, each arcuate indent 508 presents various flat, concave or convex surfaces, which directly or indirectly steer or redirect the fuel jet discharged therein from the fuel injector into different regions of the combustion chamber within the engine cylinder during operation. Each arcuate indent 508 of the first type 507 includes a flat, entry surface 510 that lies along a plane that is disposed at an acute angle relative to the plane 206 of the piston crown. Each entry surface 510 has a generally crescent shape with curved edges that terminates close to the central point 212. The entry surfaces 510 extend away from the piston surface center in a radial direction along the angled plane to provide a cambered or pitched surface that, during operation, engages and contacts every one fuel jet.

Opposite the central point 212, the entry surface 510 has a generally curved edge 516 that is sickle-shaped and forms a transition between the entry surface 510 and a recirculation surface 518. The recirculation surface 518, which forms a bottom-most portion of the arcuate indent 508, has a concave shape at a shallow radius R1 that sweeps in a spiral direction radially outwardly from the piston center portion along the curved edge 516. A cross section available for fuel jet redirection of the recirculation surface 518 is maximum along a middle portion thereof and decreases in both radial directions inwardly and outwardly with respect to the piston center portion such that it becomes minimum adjacent each of a third point 522 and the central point 212 of the generally triangular entry surface 510. During operation, a fuel jet entering the first type 507 of arcuate indent 508 will be redirected along a peripherally outer region of the combustion chamber.

Each arcuate indent 508 of the second type 509 also includes a flat, entry surface 511 that lies along a plane that is disposed at an acute angle relative to the plane 206 of the piston crown. Each entry surface 511 is generally tear-drop shaped with curved edges that begins and terminates close to the central point 212. The entry surfaces 511 extend away from the piston surface center in a generally conical fashion such that fuel jets are redirected in a radially outward and axially downward direction into the body of the piston.

Opposite the central point 212, the entry surface 511 has a generally curved edge 516 that forms a transition between the entry surface 511 and a recirculation surface 519. The recirculation surface 519, which forms an outer-most portion of the second type 509 of arcuate indent 508, has a concave shape at a tight angle R2, which is smaller than the radius R1. The recirculation surface 519 sweeps in a generally circular or curved direction along a respective plane that extends perpendicularly to the plane 206 along a diameter of the top surface that passes through the central point 212. During operation, a fuel jet entering the second type 509 of arcuate indent 508 will be redirected towards a central region of the combustion chamber.

Each arcuate indent 508 of the first type 507 or second type 509 further includes a wall 224 extending generally parallel or at a slight angle relative to a piston crown centerline or symmetry axis. The wall 224 has a variable width or height that is minimum along the wall's radially inward and outward ends, and maximum along a middle portion thereof. The wall 224 presents a top edge 226 having a generally curved shape and a bottom edge 228 that follows an external edge of the recirculation surfaces 518 and 519. At an interface or rim of each arcuate indent 508 with respect to the flat crown surface 202 is disposed a convex transition 530.

INDUSTRIAL APPLICABILITY

The present disclosure is not only applicable to internal combustion engines having reciprocating pistons, as described relative to the embodiments illustrated herein, but also to other types of applications, such as gas turbines, industrial burners and the like. In general the various arcuate indents can be formed in a structure that the fuel will impinge upon when injected by an injector into a combustion chamber. The arcuate indents and the redirection and segregation of fuel jets and plumes they provide are effective in promoting faster and more uniform premixing of fuel and air in the combustion chambers of engines, and inhibit the entrainment of recirculated combustion products from downstream regions into upstream regions of a fuel jet injected into the combustion chamber.

Figure 4:
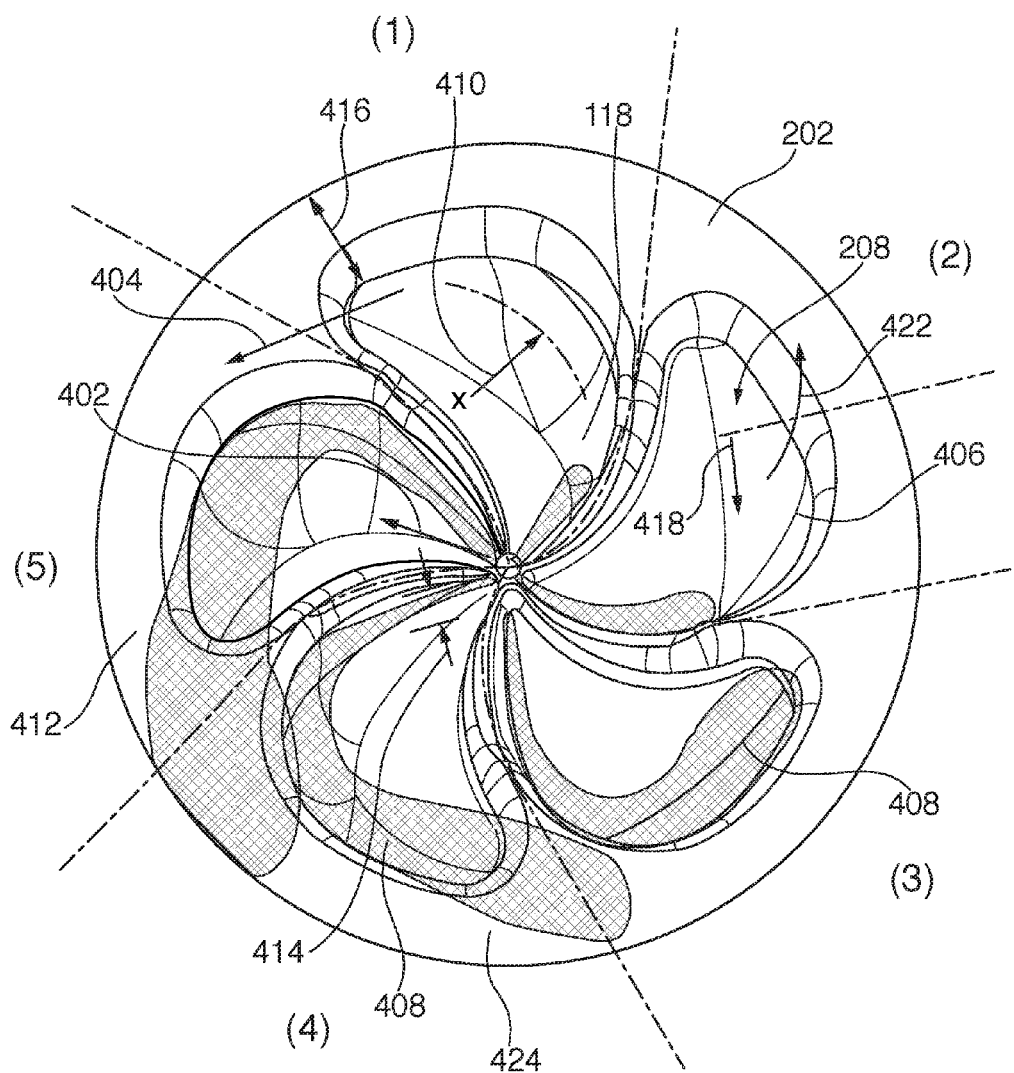
FIG. 4 is a schematic view of a top surface of a piston during various times in operation.

A time-lapse representation of the engagement and redirection of a fuel jet 118 in an arcuate indent 208 is shown for five time instances, all of which are represented together for illustration, in FIG. 4. The piston shown in FIG. 4 is segmented into five areas, a first area, denoted by "(1)," a second area, denoted by "(2)," a third area, denoted by "(3)," a fourth area, denoted by "(4)" and a fifth area, denoted by "(5)." While shown on a single piston, it should be appreciated that each of the first through fifth areas represents a snapshot of the position and distribution of a fuel jet in different instances of time, and also represent a different position of the piston in the bore, beginning at about −5 degrees after top dead center (dATDC), which can also be expressed as 5 degrees before top dead center (dBTDC), to about 30 dATDC. Of course, it should be appreciated that the distribution of the fuel jet and it interaction with the arcuate indent may change depending on the fuel injection timing of a particular engine application and combustion system.

Table 1 below illustrates the particular timing shown in the illustration of FIG. 4.

TABLE 1

| Position No. | Timing (dATDC) |
| --- | --- |
| (1) | −5 |
| (2) | −2 |
| (3) | 4 |
| (4) | 14 |
| (5) | 28 |

In reference now to FIG. 4, it can be seen that at the initiation of a fuel injection at the first position, a fuel jet 118 is provided at the entrance of an arcuate indent 208 at an entrance of floor angle 402, which can be between about 15 and 30 degrees with respect to the plane 206 of the top surface or crown surface 202. The entrance or floor angle 402 depends on the inclination of the entry portion of the arcuate indent and/or the inclination of the nozzle openings in the particular fuel injector providing the fuel jet and the axial position of the piston within the bore. As will be described below, the fuel will exit the arcuate indent at an exit angle 404, which depends on the shape of the radially outward portion of the indent and defines an interaction of the fuel jet with the cylinder head and the adjoining jets. The exit angle 404 in the illustrated embodiment can be between 10 and 60 degrees.

At the second position, which occurs moments after the first position, the fuel jet has contacted the recirculation surface and begins to spread into a wider region of contact 406 as fuel from the jet is redirected by contacting the recirculation surface. As the redirected fuel follows the recirculation surface, it will reach a depth 418 that is between 5 and 20 percent of the bore diameter, and turn around a bend radius 410 that is about 5 and 30 percent of the bore diameter. At the same time, the fuel will be redirected upwards and away from the piston face, in a re-entrant direction 422, which will create an inward motion of the fuel plume created from the jet that overhangs the trailing portion of the jet by between 0 and 12 percent of the radial length occupied by the jet and resulting plume. Because the radial location at which the fuel jet enters and exits the arcuate indent will change depending on the axial distance of the piston from the fuel injector nozzle openings, a radial entrance position 414 may be between 0 and 31 percent of the bore diameter, while a radial exit position 416 may be between 5 and 50 percent of the bore diameter.

Accordingly, at the third position, the fuel jet has continued and the region of the jet that has been redirected 408 has extended to occupy a larger portion of the recirculation surface. It is noted that a radial component of the velocity or momentum of the fuel jet causes the fuel to follow the recirculation surface as a redirected jet 408, which now forms a stream, moves in a radially outward and spiral path.

At the fourth position, the redirected jet 408 reaches an end of the arcuate indent and its momentum carries away from the piston to form a plume 424 that is directed in an upward direction away from the piston. Because of the shape of the redirected jet feeding the plume creation, the plume tends to concentrate in one direction that does not immediately infringe or stray in a direction of a neighboring plume created by an adjacent arcuate indent. In this way, the various plumes are segregated as the fuel jets are redirected to permit better fuel/air mixing in the combustion chamber, as previously described.

At the fifth position, a majority of the fuel provided from the injector is now present in a plume 412 that has mostly exited the arcuate indent in an "upward" direction or, stated differently, in a direction away from the piston face and towards the interior portion of the combustion chamber while the jet is already burning or is about to begin burning. As can be seen from the illustration of FIG. 4, some of the radial component of the momentum of the fuel may cause the plume 412 to drift in a radially outward direction. In addition to some radial outward motion, the plum has left the piston with some upward trajectory away from the piston such that the plume is still segregated or mostly or generally separated from mixing with plumes of adjacent arcuate indents.

Figure 6:
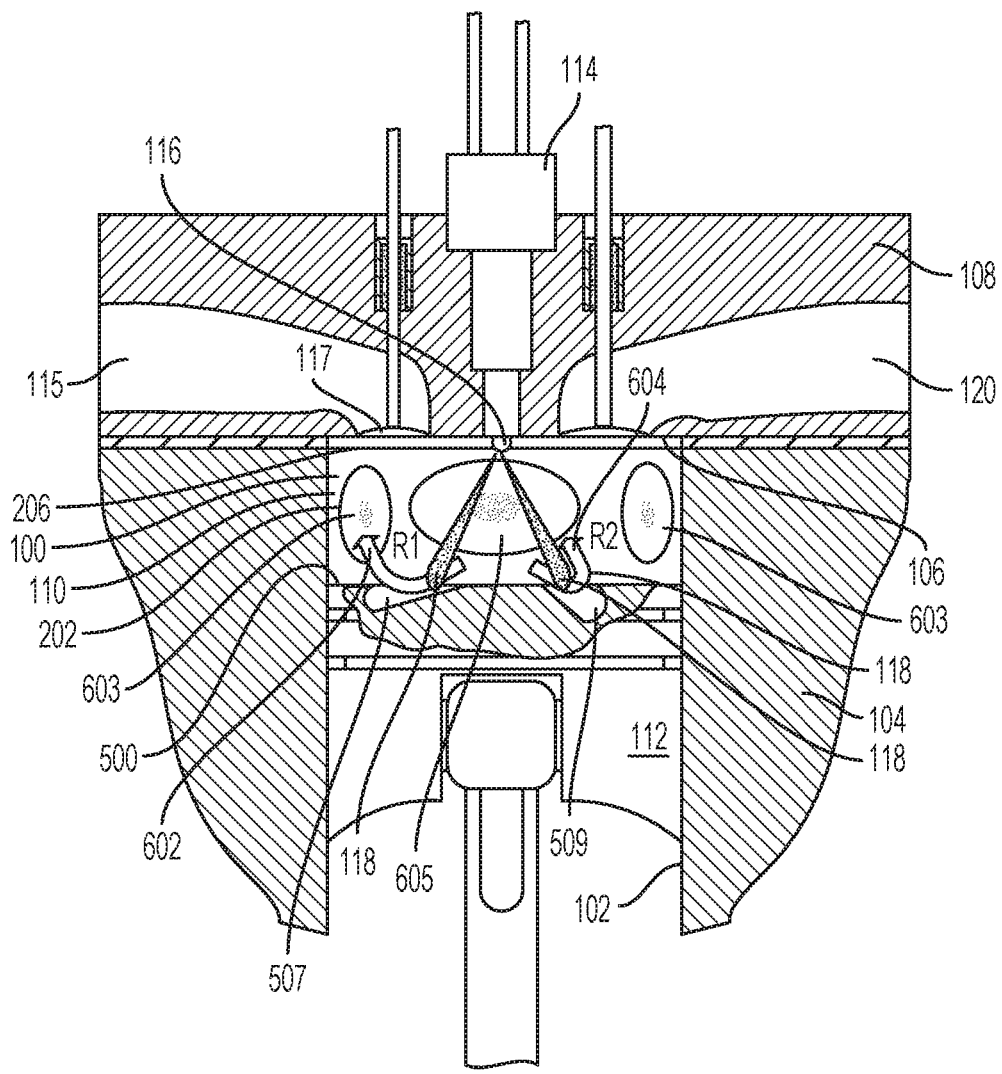
FIG. 6 is a qualitative illustration of jet placement within an engine combustion chamber during operation in accordance with the disclosure.

A qualitative illustration of the distribution of fuel jets into different regions of the combustion cylinder by use of the alternative embodiment for a piston top surface 500 as shown in FIG. 5 is shown in FIG. 6. FIG. 6 is a cross section of the combustion chamber 102 during operation. Various structures and features previously described in FIGS. 1 and 5 that are the same or similar to corresponding structures shown in FIG. 6 are denoted by the same reference numerals previously used for simplicity. In this illustration, a first arrow 602 indicates a path of a fuel jet 118 provided into a first type 507 of arcuate indent 508. As indicated by the first arrow 602, the fuel jet 118 has a radial component that turns along the radius R1 of the recirculation surface 518 (FIG. 5) such that it will occupy a region 603 that occupies a radially outward portion of the combustion chamber. Similarly, a second arrow 604 indicates a path of a fuel jet 118 provided into a second type 509 of arcuate indent 508. As indicated by the second arrow 604, the fuel jet 118 has a radial component that turns and substantially overhangs a trailing edge of the fuel jet along the radius R2 of the recirculation surface 519 (FIG. 5) such that it will occupy a region 605 that occupies a central portion of the combustion chamber.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

We claim:

1. An internal combustion engine, comprising:
an engine block having at least one cylinder bore;
a cylinder head having a flame deck surface disposed at one end of the cylinder bore;
a piston connected to a rotatable crankshaft and configured to reciprocate within the cylinder bore, the piston having a crown portion facing the flame deck surface such that a combustion chamber is defined within the cylinder bore and between a top surface of the crown portion and the flame deck surface;
a fuel injector having a nozzle tip disposed in fluid communication with the combustion chamber, the nozzle tip having at least one nozzle opening configured to inject a fuel jet into the combustion chamber and along a fuel jet centerline;
at least one arcuate indent of a first type formed in the top surface, the at least one arcuate indent of the first type being aligned with the fuel jet centerline and including a first entry surface extending from a central portion of the piston, a first recirculation surface having a concave shape at a first radius and extending along a spiral direction adjacent the entry surface, and a wall extending generally in an axial direction and disposed radially along the first recirculation surface;
at least one arcuate indent of a second type formed in the top surface and adjacent the at least one arcuate indent of the first type, the at least one arcuate indent of the second type being aligned with a second fuel jet centerline and including a second entry surface extending from a central portion of the piston, a second recirculation surface having a concave shape at a second radius that is smaller than the first radius, the second recirculation surface extending along a plane that is perpendicular to the top surface and intersecting a diameter of the top surface, and a wall extending generally in an axial direction and disposed radially along the second recirculation surface;
wherein, during operation, a fuel jet provided into the at least one arcuate indent of the first type is arranged to occupy a first region disposed in a radially outward portion of the combustion chamber, and
wherein, during operation, a fuel jet provided into the at least one arcuate indent of the second type is arranged to occupy a second region disposed in a central portion of the combustion chamber.

2. The internal combustion engine of claim 1, wherein the top surface has a generally circular shape that is defined within a circular periphery and has a generally flat shape that extends along a single plane that is nominally disposed in perpendicular relation to a centerline axis of the cylinder bore.

3. The internal combustion engine of claim 2, wherein the piston forms a plurality of arcuate indents of the first type.

4. The internal combustion engine of claim 3, wherein the piston forms a plurality of arcuate indents of the second type.

5. The internal combustion engine of claim 4, wherein each of the pluralities of arcuate indents of the first and second types are arranged in alternating fashion around a central point of the crown portion and in aligned relation to each of a plurality of nozzle openings in the nozzle tip.

6. The internal combustion engine of claim 1, wherein the first entry surface is flat.

7. The internal combustion engine of claim 5, wherein the first entry surface lies along an angled plane that is disposed at an acute angle relative to the plane of the top surface.

8. The internal combustion engine of claim 7, wherein the first entry surface has a generally triangular shape with curved edges that includes a central point disposed adjacent a piston surface center, and wherein the entry surface extends away from the piston surface center in a radial direction along the angled plane.

9. The internal combustion engine of claim 8, wherein, opposite a central point of the top surface, the first entry surface has a generally curved edge that is sickle-shaped, which forms a transition between the first entry surface and first the recirculation surface.

10. The internal combustion engine of claim 1, wherein the second entry surface is flat.

11. The internal combustion engine of claim 10, wherein the second entry surface lies along an angled plane that is disposed at an acute angle relative to the plane of the top surface.

12. The internal combustion engine of claim 11, wherein the second entry surface has a tear-drop shape with curved edges that includes a central point disposed adjacent a piston surface center, and wherein the second entry surface extends away from the piston surface center in a radial direction along the angled plane.

13. The internal combustion engine of claim 12, wherein, opposite a central point of the top surface, the second entry surface has a generally curved edge that forms a transition between the second entry surface and the second recirculation surface.

14. The internal combustion engine of claim 1, wherein the first recirculation surface has a concave shape that sweeps in a spiral direction radially outwardly from a center portion of the piston along a curved edge of the first entry surface.

15. The internal combustion engine of claim 1, wherein the second recirculation surface has a concave shape that sweeps in a radial direction away from a center portion of the piston.

16. The internal combustion engine of claim 1, wherein the walls of the at least one arcuate indent of the first and second types has a variable height that is minimum along a radially inward end of the wall.

17. The internal combustion engine of claim 16, wherein the wall presents a top edge having a generally curved shape and a bottom edge that follows the first or second recirculation surface, respectively.

18. The internal combustion engine of claim 1, wherein at an interface or rim of the at least one arcuate indent of the first type or the at least one arcuate indent of the second type with respect to the top surface is disposed a convex transition.

19. The internal combustion engine of claim 1, further comprising a recessed upper edge that creates an empty space around a top, outer periphery of the piston, which opens up space above a region along an outer peripheral cylindrical surface of the piston that is disposed above an upper seal ring of the piston and occupies a cylindrical space between the piston and an inner surface of the cylinder bore.

20. The internal combustion engine of claim 19, further comprising a frusto-conical surface extending at an acute angle between a top edge of the outer peripheral cylindrical surface of the crown portion and an outer periphery of the top surface.

\* \* \* \* \*